（12） United States Patent
Atorf

(10) Patent No.: US 7,212,804 B2
(45) Date of Patent: May 1, 2007

(54) METHOD OF OPERATING A TELECOMMUNICATION SYSTEM

(75) Inventor: Manfred Atorf, Allersberg (DE)

(73) Assignee: NXP B.V., Eindhoven (NL)

( * ) Notice: Subject to any disclaimer, the term of this patent is extended or adjusted under 35 U.S.C. 154(b) by 553 days.

(21) Appl. No.: 10/021,635

(22) Filed: Dec. 12, 2001

(65) Prior Publication Data

US 2002/0094801 A1   Jul. 18, 2002

(30) Foreign Application Priority Data

Dec. 12, 2000  (DE)  ................................ 100 61 721

(51) Int. Cl.
*H04M 11/00* (2006.01)
*H04Q 7/20* (2006.01)
(52) U.S. Cl. .................. 455/406; 455/407; 455/422.1; 455/432.1; 455/462
(58) Field of Classification Search ............... 455/405, 455/406, 421, 422.1, 432.1, 434, 437, 438, 455/439, 407, 462
See application file for complete search history.

(56) References Cited

U.S. PATENT DOCUMENTS

| 5,303,297 | A | * | 4/1994 | Hillis ......................... 455/406 |
| 5,361,399 | A | * | 11/1994 | Linquist et al. .......... 455/412.2 |
| 5,566,236 | A | * | 10/1996 | MeLampy et al. ...... 379/210.01 |
| 5,758,288 | A | * | 5/1998 | Dunn et al. ............... 455/456.5 |
| 5,819,177 | A | * | 10/1998 | Vucetic et al. .............. 455/425 |
| 6,078,805 | A | * | 6/2000 | Scott .......................... 455/406 |
| 6,201,957 | B1 | * | 3/2001 | Son et al. .................... 455/406 |
| 6,263,050 | B1 | * | 7/2001 | Akhteruzzaman et al. .... 379/45 |
| 6,546,253 | B1 | * | 4/2003 | Chow et al. ................. 455/439 |
| 6,671,506 | B1 | * | 12/2003 | Lee ............................. 455/406 |
| 6,785,536 | B1 | * | 8/2004 | Lee et al. .................... 455/408 |

FOREIGN PATENT DOCUMENTS

WO        WO0027152        10/1999

* cited by examiner

*Primary Examiner*—Binh K. Tieu

(57) ABSTRACT

A method of operating a telecommunication system that enables operation of a mobile telephone at different user rates that are dependent on the instantaneous location, where
  a local fixed station at the user end transmits a first signal of limited range that is received by a mobile telephone that is associated with the fixed station, that is, provided that the mobile telephone is present within the range of the transmission signal, and
  the mobile telephone transmits, in response to the reception of the first signal, a second signal to a base station of the telecommunication system which switches over to a different user rate in response to the reception of the second signal.

30 Claims, 1 Drawing Sheet

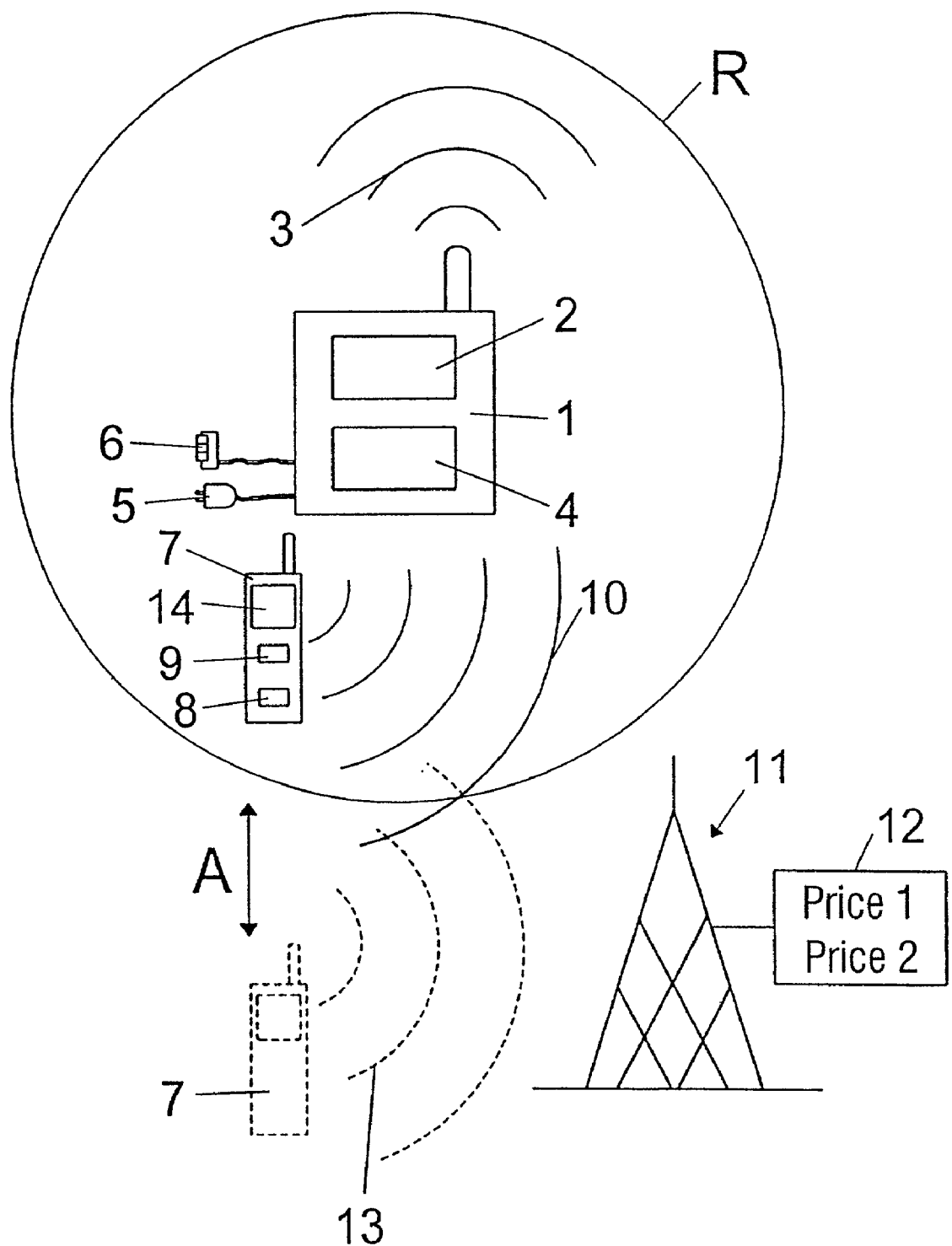

METHOD OF OPERATING A TELECOMMUNICATION SYSTEM

The invention relates to a method of operating a telecommunication system that enables operation of a mobile telephone at different user rates that are dependent on the instantaneous location.

The existing pronounced differences between the high mobile telephone rates and the significantly cheaper fixed network rates have led to the development of a telecommunication system in which the user of a mobile telephone can make a mobile telephone call either at the more expensive mobile telephone rate or at the more attractive fixed network rate, that is, depending on the instantaneous location of the user. Such a known system includes a GSM home base station that is locally installed at the user end and is capable of recognizing a mobile telephone that is present in the local zone. When such a mobile telephone is present in the local zone, a call can be made at the more attractive fixed network rate via the fixed network connection whereto the GSM home base station is connected. However, when the mobile telephone is situated outside the local zone, the call is not made via the fixed network but via the mobile network and at the more expensive mobile telephone rate. A condition in this respect, however, is that the operator of the mobile telephone network should also operate a fixed network via which a call can be made in dependence on the mode of operation. This known system also has the problem that a call that is made via the fixed network because of the mobile telephone is near enough to the GSM home base station is broken off when the person making the call and carrying the mobile telephone leaves the local zone. This is because in that event the GSM home base station no longer recognizes the mobile telephone and the call should take place via the radio network. The person making the call is then forced to dial the relevant number again so as to establish the connection once more. In the reverse case, when the person making the call enters the local zone, the mobile radio connection can remain established despite the adequate nearness to the GSM home base station; however, the call still takes place at the higher mobile telephone rate, so that no benefit can be derived from the advantages offered by this system. When the user wishes to take advantage of the cheaper fixed network rate, the call must again be terminated and established again, that is, via the fixed network connection.

It is an object of the invention to provide a method that eliminates the described problems.

To this end, a method of the kind set forth in accordance with the invention is characterized in that a local fixed station at the user end transmits a first signal of limited range that is received by a mobile telephone associated with the fixed station, that is, provided that this mobile telephone is present within the range of the transmission signal, and that the mobile telephone transmits, in response to the reception of the first signal, a second signal to a base station of the telecommunication system which switches over to a different user rate in response to the reception of the second signal.

According to the method in conformity with the invention the local fixed station transmits a signal of limited range which is received by the mobile telephone when the latter is close enough to the fixed station. The information for the base station that the mobile telephone is sufficiently close to the fixed station and that hence the telecommunication can be charged at the more attractive user rate is subsequently applied to the base station by the mobile telephone itself; to this end, the mobile telephone transmits a second signal. The rate is then switched over upon reception of said second signal by the base station. The method utilizes exclusively the mobile radio network for the signal and information transmission; a fixed network is not required for this purpose. Consequently, this method is particularly attractive for network operators that operate exclusively a mobile radio network. Such operators can then offer their subscribers the possibility of different user rates that are dependent on the location. Moreover, according to the method in conformity with the invention calls will not be interrupted the range of the fixed station signal is entered or left behind, because in such cases merely an appropriate message is sent to the base station via the mobile telephone; the base station then selects the relevant user rate. The foregoing takes place independently of the call that takes place in parallel via the mobile radio network, that is, without being noticed by the user.

The fixed station advantageously transmits an encoded first signal; this means that the fixed station and the mobile telephone are linked to one another via the signal code. The fixed station signal can thus be received only by an associated mobile telephone that is capable of reading the encoded first signal. The first signal may be transmitted so as to be clocked at predetermined time intervals but also continuously.

According to a further elaboration of the idea of the invention the second signal may be transmitted as soon as the mobile telephone that is ready for operation is within the range of the first signal, or the second signal is transmitted only when a speech connection is to be established or has already been established and the mobile telephone is within the range of the first signal. In the context of the first alternative version of the invention, therefore, the second signal is transmitted irrespective of the fact whether a speech connection is to be established or has already been established; this means that the base station in any case receives the information that the mobile telephone is near enough to the fixed station. In the context of the second alternative version the second signal is transmitted only if a speech connection is to be established or a call is already taking place and the mobile telephone is close enough to the fixed station.

Irrespective of the alternative used to transmit the second signal to the base station, transmission can take place only once or a number of times in succession at regular intervals; alternatively the second signal may also be output continuously.

When the second signal is transmitted several times in succession in a clocked manner or is transmitted continuously, the base station can establish, on the basis of the arrival of the second signal, whether the mobile telephone is still close enough to the fixed station or not. When the clocked second signal does not appear or is interrupted in the case of the continuous transmission mode, the person making the telephone call has moved out of the range of the fixed station. If the second signal is transmitted only once, regardless of the fact whether this takes place immediately when the mobile telephone moves into the local zone of the fixed station or only when the speech connection is established, it is advantageous when the mobile telephone applies a third signal to the base station when it is outside the range of the first signal or has left the range of the first signal. In that case the base station receives, via the third signal issued by the mobile telephone, the information that it is necessary to switch over to the appropriate user rate again which applies when the mobile telephone is situated sufficiently far from the fixed station.

For the user it is advantageous when the display of the mobile telephone indicates at least when the mobile telephone is within the range of the first signal, so that the user can recognize that calling at the cheaper user rate is possible.

The first signal is preferably a radio signal; preferably, use is made of a Bluetooth signal for which an appropriate Bluetooth communication interface is provided in the mobile telephone. It is also possible to utilize a DECT signal with a suitable DECT communication interface in the mobile telephone.

The invention not only relates to the method but also to a system that is suitable for carrying out the described method and includes a mobile radio network with at least one base station as well as a mobile telephone that can operate within the mobile radio network, and a local fixed station that is provided at the user end and is associated with the mobile telephone, where the fixed station includes a transmission means for transmitting a first signal of limited range, the mobile telephone includes a receiving means for the first signal, the mobile telephone includes a transmission means for a second signal that is to be transmitted to the base station in response to the reception of the first signal, and the base station includes means for switching over, in response to the reception of the second signal, from a first to a second user rate for the use of the mobile radio network by the mobile telephone.

The transmission means of the fixed station and the receiving means of the mobile telephone may be constructed so as to transmit an encoded first signal. The transmission means of the fixed station, moreover, may enable a clocked or continuous transmission mode for the first signal.

According to a further elaboration of the idea of the invention the transmission means of the mobile telephone may be arranged to transmit the second signal directly in response to the reception of the first signal by the mobile telephone that is ready for operation. Alternatively, the transmission means may also be arranged to transmit the second signal only when a speech connection is to be established or already exists and when the mobile telephone is situated within the range of the first signal. In that case the second signal can be transmitted only once or several times in succession in a clocked fashion or continuously.

Notably when the second signal is transmitted only once, it is advantageous when the transmission means of the mobile telephone are arranged to transmit a third signal to the base station in the case of a location outside the range of the first signal or in the case of departure from the range of the first signal.

Preferably, it can at least be indicated on the display of the mobile telephone when the mobile telephone is situated within the range of the first signal; if desired, a corresponding indication can also be given when the user moves out of the range. This can be indicated to the user, for example by making the mobile telephone produce a beep or the like that indicates the departure from the local zone of the fixed station, irrespective of the fact whether a call is being made or not at the relevant instant. Evidently, it is also possible to employ this beep to inform the user of the mobile telephone about the entry into the range.

The transmission means of the fixed station and the receiving means of the mobile telephone may be arranged to transmit and receive, respectively, the first signal in the form of a radio signal, preferably a Bluetooth signal or a DECT signal, while utilizing suitable communication interfaces.

In order to realize protection against abuse of the system, it is advantageous to provide the fixed station with a mains connection for power supply. The fixed station can then operate only via a 220 V lead, so that the user of the system cannot simply carry the fixed station along with the mobile telephone with the result that the mobile telephone is always within the range of the fixed station. It is also advantageous to provide the fixed station with receiving and comparison means for an access code that is to be applied to the fixed station via the mobile telephone in order to put the fixed station into operation, that is, also after an interruption of the power supply. If a third person attending the fixed station and/or the mobile telephone does not know this access code, it is impossible for this person to make unauthorized use of the system.

In a particularly advantageous further embodiment of the invention the fixed station may be provided with a connection device for connection to a fixed network that is preferably operated by the network operator, and also with a device via which the fixed station can be enabled for operation by the network operator, that is, by transmission of an enable code. The operation of the fixed station in conformity with this embodiment of the invention is controlled by the network operator per se. To this end, use is made of a fixed network connection via which the network operator has direct access to the fixed station. The fixed network should preferably be operated by the network operator per se. Alternatively, of course, it is possible that the network operator accesses the fixed station via the fixed network that is operated by another network operator.

The fixed station may include, additionally or alternatively, a receiving means for receiving an enable signal that can be supplied by the base station via the mobile radio network, and also a device for enabling.

In addition to the system, the invention also relates to a fixed station that can be used in conjunction with the method or the system. This fixed station is characterized in that it includes transmission means for transmitting an encoded radio signal of limited range. Further advantageous embodiments of the fixed station are disclosed in the dependent claims.

Further advantages, features and details of the invention will become apparent from the following description of an embodiment that is given with reference to the drawing.

The drawing shows a circuit diagram of the system in accordance with the invention and a fixed station in accordance with the invention. The fixed station 1 is arranged at the location of the user, that is, normally in a building. The fixed station includes a transmission means 2 via which a signal 3 of limited range is transmitted. The limited range is denoted by the large circle R. The signal is preferably a radio signal, notably a Bluetooth signal. The signal 3 may be transmitted in a clocked fashion at predetermined instants or continuously by the fixed station 1.

The fixed station 1 also includes a receiving means 4 which serves to receive an access code which is transmitted so as to enable operation by the mobile telephone yet to be described. A mains connection to a 220 V lead is provided for the power supply of the fixed station and its elements; the fixed station 1 also includes a connection 6 to a fixed network.

The system also includes a mobile telephone 7 which can be moved into the range and out of the range at will as indicated by the arrow A. The mobile telephone, being shown in the form of a circuit diagram, includes a receiving device 8 which serves to receive the encoded signals 3 that are transmitted by the fixed station 1, that is, as long as the mobile telephone 7 is within the range R. The receiving means 8 include a communication interface which corresponds to the radio signal standard so, for example, a Bluetooth interface or a DECT interface.

When the signal 3 is received via the receiving means 8, the mobile telephone transmits, via the transmission means 9, signals 10 to a base station 11 of the mobile radio network, the signals 10 indicating that the first signal 3 has been received and that hence the mobile telephone is within the range R of the fixed station 1. The base station 11 includes corresponding receiving means for receiving and processing the signal 10. When the signal 10 is received by the base station 11, switching over from a "rate 1" to a "rate 2" is performed therein by means of suitable switching means 12; this rate then serves as a basis for charging the calls for as long as the mobile telephone 7 is within the range R.

When the mobile telephone 7 moves out of the range R, the base station 11, or the switching means 12, switches over again from the rate II to the rate I. The base station 11 derives the knowledge concerning the instantaneous location of the mobile telephone 7 from the fact that the signal 10 is no longer received. The signal 10 may be transmitted continuously during the stay within the range R or be successively clocked. When the signal 10 does not arrive, the base station 11 thus knows that the mobile telephone is no longer present within the range R so that the switching over of the rate can take place. Evidently, the signal 10 is no longer transmitted either when the mobile telephone 7 is switched off. In that case the rate preferably is also switched over to the mobile radio rate. When the mobile telephone 7 is put into operation again, it receives the signal 3 and can transmit the signal 10 so that the base station can again switch to the cheaper rate.

In case the signal 10 is not clocked or continuously transmitted, the transmission means 9 can transmit a third signal 13, as denoted by a dashed line, when the mobile telephone 7 moves out of the range R. When this signal reaches the base station 11, the rate is also switched over.

The mobile telephone 7 is also provided with a display 14 which can show the user, via a suitable marker or the like, when the user is within the range R.

In order to put the fixed station 1 into operation, the mobile telephone 7 should apply an access code thereto via its keyboard, said access code being received by the receiving means 4. The receiving means 4, also being constructed as comparison means, compare the access code with a stored access code; the fixed station 1 can be put into operation in the case of correspondence.

An alternative mode of putting into operation can be performed via the fixed network connection 6. The network operator can directly access the fixed station 1 via this fixed network connection 6, thus selecting this station for putting into operation when the relevant conditions are satisfied. The fixed network connection 6, moreover, offers a given protection against abuse, because removal of the fixed station from the instantaneous location necessitates separation of the power supply connection 5 and also of the fixed network connection 6 and reconnection of the fixed station 1 in a different location. Putting into operation must then be performed again; this requires intervention by the network operator that thus knows about the change of location and hence can detect possible abuse.

The invention claimed is:

1. A method of operating a telecommunication system that enables operation of a mobile telephone at different user rates that are dependent on the instantaneous location, characterized in that a local fixed station at the user end transmits a first signal of limited range that is received by a mobile telephone that is associated with the fixed station, that is, provided that this mobile telephone is within the range of the transmission signal, and that the mobile telephone transmits that it received the first signal via a second signal to a base station of the telecommunication system which switches over to a different user rate in response to the reception of the second signal.

2. A method as claimed in claim 1, characterized in that the fixed station transmits an encoded first signal.

3. A method as claimed in claim 1, characterized in that the first signal is transmitted in a clocked mode or continuously.

4. A method as claimed in claim 1, characterized in that the second signal is transmitted as soon as the mobile telephone that is ready for operation is present within the range of the first signal, or that the second signal is transmitted only if a speech connection is to be established, or has been established, and the mobile telephone is situated within the range of the first signal.

5. A method as claimed in claim 4, characterized in that the second signal is transmitted only once, or a number of times in succession at intervals, or is transmitted continuously.

6. A method as claimed in claim 1, characterized in that the mobile telephone transmits a third signal to the base station when it is outside the range of the first signal or has left the range of the first signal.

7. A method as claimed in claim 1, characterized in that the display of the mobile telephone indicates when the mobile telephone is present within the range of the first signal.

8. A method as claimed in claim 1, characterized in that the first signal is a radio signal.

9. A method as claimed in claim 8, characterized in that the first signal is a Bluetooth signal or a DECT signal.

10. A system comprising: a mobile radio network with at least one base station as well as a mobile telephone that can operate within the mobile radio network, and a local fixed station that is provided at the user end and is associated with the mobile telephone, where
   the fixed station (1) includes a transmission means (2) for transmitting a first signal (3) of limited range (R),
   the mobile telephone (7) includes a receiving means (8) for the first signal (3),
   the mobile telephone (7) includes a transmission means (9) for a second signal (10) that is to be transmitted to the base station in response to the reception of the first signal (3), and the base station (11) includes means (12) for switching over, in response to the reception of the second signal (10), from a first to a second user rate for the use of the mobile radio network by the mobile telephone (7).

11. A system as claimed in claim 10, characterized in that the transmission means (2) of the fixed station (1) are constructed so as to transmit and the receiving means (8) of the mobile telephone (7) are constructed so as to receive an encoded first signal (3).

12. A system as claimed in claim 10, characterized in that the transmission means (2) of the fixed station (1) are constructed for the clocked or continuous transmission of the first signal (3).

13. A system as claimed in claim 10, characterized in that the transmission means (9) of the mobile telephone (7) are arranged to transmit the second signal (10) directly in response to the reception of the first signal (3) by the mobile telephone (7) that is ready for operation, or that the transmission means (9) are arranged to transmit the second signal (10) only when a speech connection is established or already exists and when the mobile telephone (7) is present within the range (R) of the first signal (3).

14. A system as claimed in claim 13, characterized in that the transmission means (9) are constructed in such a manner that the second signal (10) is transmitted only once, or a number of times in succession at intervals, or is transmitted continuously.

15. A system as claimed in claim 10, characterized in that the transmission means (9) of the mobile telephone (7) are arranged to transmit a third signal (13) to the base station (11) in the case of a location outside the range (R) of the first signal (3) or upon departure from the range (R) of the first signal (3).

16. A system as claimed in claim 10, characterized in that on the display (14) of the mobile telephone (7) it can at least be indicated when the mobile telephone (7) is present within the range (R) of the first signal (3).

17. A system as claimed in claim 10, characterized in that the transmission means (2) of the fixed station (1) and the receiving means (8) of the mobile telephone (7) are arranged to transmit and receive, respectively, the first signal (3) in the form of a radio signal.

18. A system as claimed in claim 17, characterized in that the first signal (3) is a Bluetooth signal or a DECT signal.

19. A system as claimed in claim 10, characterized in that the fixed station (1) includes a mains connection (5) for power supply.

20. A system as claimed in claim 10, characterized in that the fixed station (1) includes receiving and comparison means (4) for an access code that is to be applied to the fixed station (1), via the mobile telephone (7), in order to put the fixed station into operation, that is, also after an interruption of the power supply.

21. A system as claimed in claim 10, characterized in that the fixed station (1) includes a connection device (6) for connection to a fixed network that is preferably operated by the network operator, and also a device via which the network operator can enable the fixed station (1) for operation by transmission of an enable code.

22. A system as claimed in claim 10, characterized in that the fixed station (1) includes a receiving means for receiving an enable signal that can be issued by the base station (11) via the mobile radio network, as well as a device for enabling.

23. A fixed station for use in the method of claim 1, comprising a transmission means (2) for transmitting an encoded radio signal (3) of limited range (R), said fixed station further comprising receiving and comparison means for an access code that is to be applied to a fixed station, via a mobile telephone, in order to put the fixed station into operation.

24. A fixed station as claimed in claim 23, characterized in that the transmission means (2) are arranged to transmit a Bluetooth signal or a DECT signal.

25. A fixed station as claimed in claim 23, characterized in that the transmission means (2) of the fixed station (1) are arranged for clocked or continuous transmission of the first signal (3).

26. A fixed station as claimed in claim 23, characterized in that the fixed station (1) includes a mains connection (5) for power supply.

27. A fixed station as claimed in claim 23, characterized in that the fixed station (1) includes receiving and comparison means (4) for an access code that is to be applied to the fixed station (1), via the mobile telephone (7), in order to put the fixed station into operation, that is, also after an interruption of the power supply.

28. A fixed station as claimed in claim 23, characterized in that the fixed station (1) includes a connection device (6) for connection to a fixed network that is preferably operated by the network operator, and also a device via which the network operator can enable the fixed station for operation by transmission of an enable code.

29. A fixed station as claimed in claim 23, characterized in that the fixed station (1) includes a receiving means for receiving an enable signal that can be issued by the base station, as well as a device for enabling.

30. A method of operating a telecommunication system that enables operation of a mobile telephone at different user rates that are dependent on the instantaneous location, wherein a local fixed station at the user end transmits a first signal of limited range that is received by a mobile telephone that is associated with the fixed station, that is, provided that this mobile telephone is within the range of the transmission signal, and that the mobile telephone transmits that it received the first signal via a second signal to a base station of the telecommunication system which switches over to a different mobile radio user rate in response to the reception of the second signal.

* * * * *